(12) United States Patent
Jung et al.

(10) Patent No.: US 8,682,166 B2
(45) Date of Patent: Mar. 25, 2014

(54) SUBCARRIER MULTIPLEXING TYPE OPTICAL COMMUNICATION METHOD AND PASSIVE OPTICAL NETWORK USING THE SAME

(75) Inventors: Dae-Kwang Jung, Suwon-si (KR); Seong-Taek Hwang, Pyeongtaek-si (KR); Jin-Woo Park, Seoul (KR); Sang-Lok Lee, Seoul (KR); Sung-Kuen Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1157 days.

(21) Appl. No.: 11/620,231

(22) Filed: Jan. 5, 2007

(65) Prior Publication Data

US 2007/0258713 A1 Nov. 8, 2007

(30) Foreign Application Priority Data

May 2, 2006 (KR) .................................. 2006-39607

(51) Int. Cl.
*H04J 14/02* (2006.01)
*H04B 10/272* (2013.01)

(52) U.S. Cl.
USPC .............................................. 398/76; 398/72

(58) Field of Classification Search
USPC .................................... 398/46, 70, 71, 72, 76
See application file for complete search history.

(56) References Cited

U.S. PATENT DOCUMENTS

| 5,500,908 | A | | 3/1996 | Liedenbaum et al. ............ 385/5 |
| 5,550,666 | A | * | 8/1996 | Zirngibl ......................... 398/72 |
| 5,613,210 | A | * | 3/1997 | Van Driel et al. ............... 455/45 |
| 5,896,211 | A | * | 4/1999 | Watanabe ........................ 398/76 |
| 2004/0208537 | A1 | * | 10/2004 | Lee et al. ........................ 398/41 |

FOREIGN PATENT DOCUMENTS

| JP | 2001-86058 | 3/2001 | ............... H04B 7/26 |
| KR | 2005-28987 | 3/2005 | ............... H04J 14/02 |
| KR | 2005-61893 | 6/2005 | ............. H04L 12/28 |
| KR | 2005-72947 | 7/2005 | ......... G11C 11/4093 |

* cited by examiner

*Primary Examiner* — Nathan Curs
(74) *Attorney, Agent, or Firm* — Cha & Reiter, LLC

(57) ABSTRACT

Disclosed is a subcarrier multiplexing type optical communication method including the steps of receiving a first optical signal composed of a plurality of subcarrier channels having different frequencies, creating a second optical signal having a wavelength different from a wavelength of a received signal; and detecting the subcarrier channels from a third optical signal obtained by subjecting the first optical signal to wavelength shift by means of the second optical signal.

13 Claims, 7 Drawing Sheets

SUBCARRIER MULTIPLEXING TYPE OPTICAL COMMUNICATION METHOD AND PASSIVE OPTICAL NETWORK USING THE SAME

CLAIM OF PRIORITY

This application claims the benefit of the earlier filing date, pursuant to 35 USC 119(e), to that patent application entitled "Subcarrier Multiplexing Type Optical Communication Method and Passive Optical Network Using the Same" filed with the Korean Intellectual Property Office on May 2, 2006 and assigned Serial No. 2006-39607, the contents of which are incorporated herein by reference.

BACKGROUND OF THE INVENTION

1. Field of the Invention

The present invention relates to an optical communication network, and more particularly to a subcarrier-type passive optical network.

2. Description of the Related Art

Optical networks are being more widespread, as they are suitable for various multimedia services based on extensive use of Internet and broadband signal transmission. The optical networks are typically used in-line with FTTx (Fiber To The x) technology for guaranteeing Gigabit per second (Gbps)-grade transmission speed by using optical fibers.

Optical communication methods applicable to optical networks include (1) a wavelength division multiplexing method, in which a plurality of different wavelengths are allocated to respective subscribers so that light can be allocated based on the wavelength, (2) a time division multiplexing method, in which a single wavelength of light is split into a plurality of time slots, and the time slots are allocated to respective subscribers; and (3) a subcarrier multiplexing method, in which a single wavelength of light is split into a plurality of channels, and the channels are loaded with different proper subcarrier frequencies that are allocated to respective subscribers.

According to the subcarrier multiplexing method, a single wavelength is shared by a number of subscribers, in a manner similar to that of the time division multiplexing method. The subcarrier multiplexing method is applicable to a passive optical network, for example, which includes a central office, a plurality of subscribers, and a remote node positioned between the central office and the subscribers.

Base on transmission requirements, one of the wavelength division multiplexing method, the time division multiplexing method, or the subcarrier multiplexing method may be selected and used for optical networks.

FIG. 1 shows the brief construction of a conventional passive optical network. Referring to FIG. 1, the conventional passive optical network 100 includes an optical line terminal 110, a remote node 120, and a plurality of optical network units 130-1 to 130-N.

The optical line terminal 110 includes a light source 112 for creating downstream (downward) optical signals to be provided to the optical network units 130-1 to 130-N, an upstream receiver 113 for detecting data from upstream optical signals received from the respective optical network units 130-1 to 130-N, and a wavelength division multiplexer 111.

FIG. 2a is a graph showing downstream optical signals, which are obtained by multiplexing a plurality of subcarrier channels. The light source 112 creates downstream optical signals 101 ($\lambda_D$) consisting of subcarrier channels $f_1$-$f_m$, which have proper frequencies allocated to respective optical network units 130-1 to 130-N. The light source 112 may include a frequency creation unit, a modulator, and light creation means.

The remote node 120 is linked to the optical line terminal 110 via a single optical fiber. The remote node 120 may be positioned closest to the optical network units 130-1 to 130-N. The remote node 120 may have an optical splitter 121 having 1×N port structure. As shown in FIG. 2b, the remote node 120 multiplexes upstream (upward) subcarrier channels, which have been created by respective optical network units 130-1 to 130-N, into upstream optical signals and outputs them to the optical line terminal 110.

Each of the optical network units 130-1 to 130-N includes a downstream receiver 132, an upstream light source 133 for creating upstream upstreamsubcarrier channels, and a wavelength division multiplexer 313 linked to the remote node 120 while being connected to the upstream upstreamlight source 133 and the downstream receiver 132. The downstream receiver 132 filters the downstream optical signals so as to obtain a subcarrier channel (one of $f_1$-$f_m$), which has a corresponding frequency, and detects data from it.

The upstream light source 133 creates an upstream subcarrier channel (one of $f_1$-$f_m$), which has a proper frequency, as shown in FIG. 2b.

However, when upstream subcarrier channels having the same wavelength are detected by a single upstream receiver, interference between them may lead to optical interference. In order to reduce the optical interference, the number of subscribers accommodated by an optical network must be limited. In other words, the optical \interference occurs when subcarriers having different proper frequencies are allocated to channels having the same wavelength and are inputted to a single optical detector. The resulting interference between subcarrier channels creates subcarrier frequencies. Removing this interference increases the cost for installing and maintaining the network.

SUMMARY OF THE INVENTION

Accordingly, the present invention has been made to solve the above-mentioned problems occurring in the prior art and provides additional advantages, by providing a subcarrier-type passive optical network capable of minimizing optical beat interference.

In one aspect of the present invention, there is provided a subcarrier multiplexing type optical communication method including the steps of receiving a first optical signal composed of a plurality of subcarrier channels having different frequencies, creating a second optical signal having a wavelength different from a wavelength of a received signal and detecting the subcarrier channels from a third optical signal obtained by subjecting the first optical signal to wavelength shift by means of the second optical signal.

In accordance with another aspect of the present invention, there is provided a subcarrier multiplexing type optical line terminal for detecting data from a plurality of upstream subcarrier channels, the terminal including a light source for creating light having a wavelength different from a wavelength of an upstream optical signal composed of the upstream subcarrier channels; an optical detector for converting the upstream optical signal into an electrical signal, the upstream optical signal having been subjected to wavelength conversion by the light; and a plurality of demodulators for detecting data of respective corresponding subcarrier channels from the electric signal.

BRIEF DESCRIPTION OF THE DRAWINGS

The above features and advantages of the present invention will be more apparent from the following detailed description taken in conjunction with the accompanying drawings, in which.

DETAILED DESCRIPTION OF THE INVENTION

Figure 1:
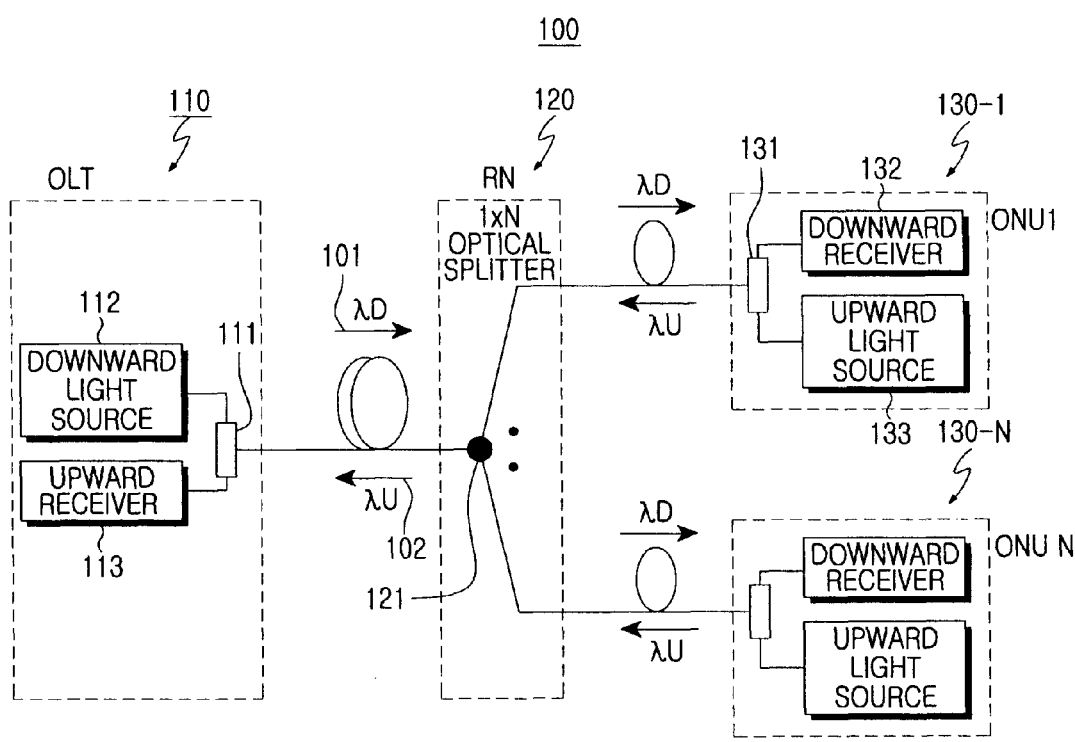
FIG. 1 shows the construction of a conventional subcarrier multiplexing type passive optical network.
Figure 2A:
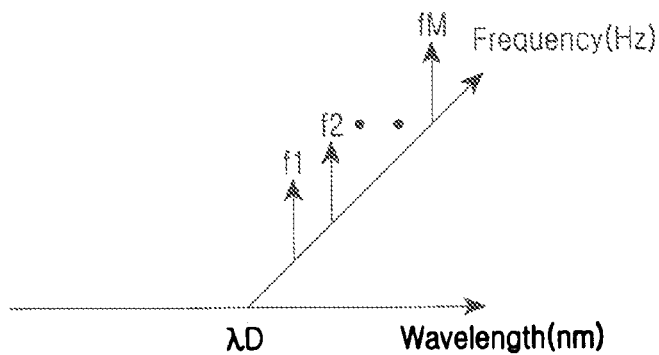
FIG. 2a is a graph showing downstream optical signals, which are obtained by multiplexing a plurality of subcarrier channels.
Figure 2B:
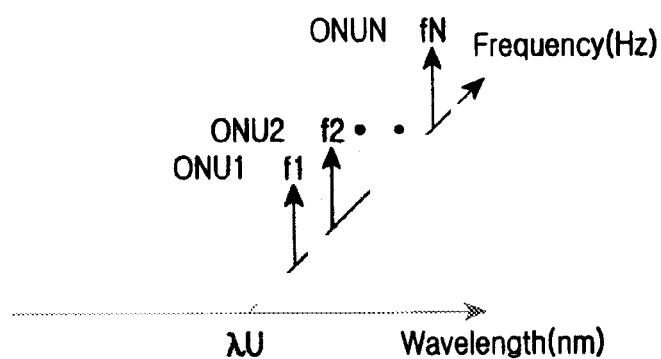
FIG. 2b is a graph showing upstream optical signals, which are obtained by multiplexing a plurality of subcarrier channels.

Hereinafter, embodiments of the present invention will be described with reference to the accompanying drawings. For the purposes of clarity and simplicity, a detailed description of known functions and configurations incorporated herein is omitted to avoid making the subject matter of the present invention unclear.

Optical beat interference occurs when a single optical detector receives a plurality of subcarrier channels, which have proper frequencies allocated thereto The resulting interference between subcarrier channels degrades the optical detector and decreases the reception performance. Particularly, when at least two subcarrier channels with respective proper frequencies are inputted to a single optical detector, the resulting optical beat interference creates an undesired frequency channel between the subcarrier channels. In this case, the frequency channel has the shape of a convolution, including a spectrum between both subcarrier channels The subcarrier channels are defined by equations (1) and (2) below, respectively.

$$E_1 = A_1 \cos[\omega_{01} t + \phi_1(t)]$$

$$E_2 = A_2 \cos[\omega_{02} t + \phi_2(t)]$$

wherein
$A_1$ and $A_2$ refer to the amplitudes of respective subcarrier channels,
$\omega_{01}$ and $\omega_{02}$ refer to their frequencies, and
$\phi_1$ and $\phi_2$ refer to their phases.

In a typical optical network, the subcarrier channels are transmitted while being loaded onto a single optical signal, which is converted into an optical current by an optical detector. The converted optical current $i(t)$ is proportional to the intensity of the optical signal $I(t)$, and may be expresses as: by.

$$i(t) = RI(t) = RL\{[E_1(t) + E_2(t)]^2\} \quad (3)$$

where
$i(t)$ is the optical current;
$R$ represents the responsivity of the optical detector;
$L$ represents; and operator indicating the low pass filter characteristics of the optical detector
$I(t)$ is the intensity of the optical signal.

The low pass filter characteristics mean that as the response rate of the device is lower than very high frequencies, it cannot detect the optical signal, except for the envelope of the subcarrier channels.

The intensity of the optical signal is represented as:

$$I(t) = I_1(t) + I_2(t) + I_x(t) \quad (4)$$
$$= I_1(t) + I_2(t) + 2\sqrt{I_1(t)I_2(t)} \cos$$
$$[(\omega_{01} + \omega_{02})t + \phi_1(t) - pho_2(t)]\cos\theta_{12}$$

where, $\theta_{12}$ refers to the difference in polarization angle between both subcarrier channels, and
$I_X$ refers to the intensity of a frequency channel resulting from interference between both subcarrier channels.

The phase of the subcarrier channels varies randomly, and their power spectral density is expressed as:

$$S_i(f) = S_{I1}(f) + S_{I2}(f) + L\{4S_{e1}(f) \times S_{e2}(f)\} \cos^2 \theta_{12} \quad (5)$$

where,
$S_{I1}(f)$ and $S_{I2}(f)$ refer to PSD of $I_1(t)$ and $I_2(t)$ described in equation (4),
$S_{e1}(f)$ and $S_{e2}(f)$ refer to PSD of the optical signal field,
$L$ refers to an operation constant of the lower pass filter, and
$L\{4S_{e1}(f) \times S_{e2}(f)\} \cos^2 \theta_{12}$ refers to a power spectrum of the frequency channel resulting from the optical beat interference.

Particularly, this term corresponds to the convolution between power spectrums of normally inputted subcarrier channels, and its width is equal to the sum of spectrum width of both subcarrier channels.

In summary, the optical beat interference between subcarrier channels is unavoidable in the case of subcarrier multiplexing type optical communication, as is clear from equations (1) to (5). Therefore, the present invention proposes that, in order to suppress the optical beat interference between subcarrier channels constituting an optical signal by using a wavelength, the wavelength of the optical signal is shifted toward the optical line terminal and a frequency gap is created between the subcarrier channels so that interference does not occur.

A subcarrier multiplexing type optical communication method according to the present invention includes the steps of receiving a first optical signal consisting of a plurality of subcarrier channels having different frequencies, creating a second optical signal having a frequency different from that of the received optical signal, and detecting the subcarrier channels from a third optical signal, which is created when the first optical signal undergoes wavelength shift by means of the second optical signal.

Figure 3:
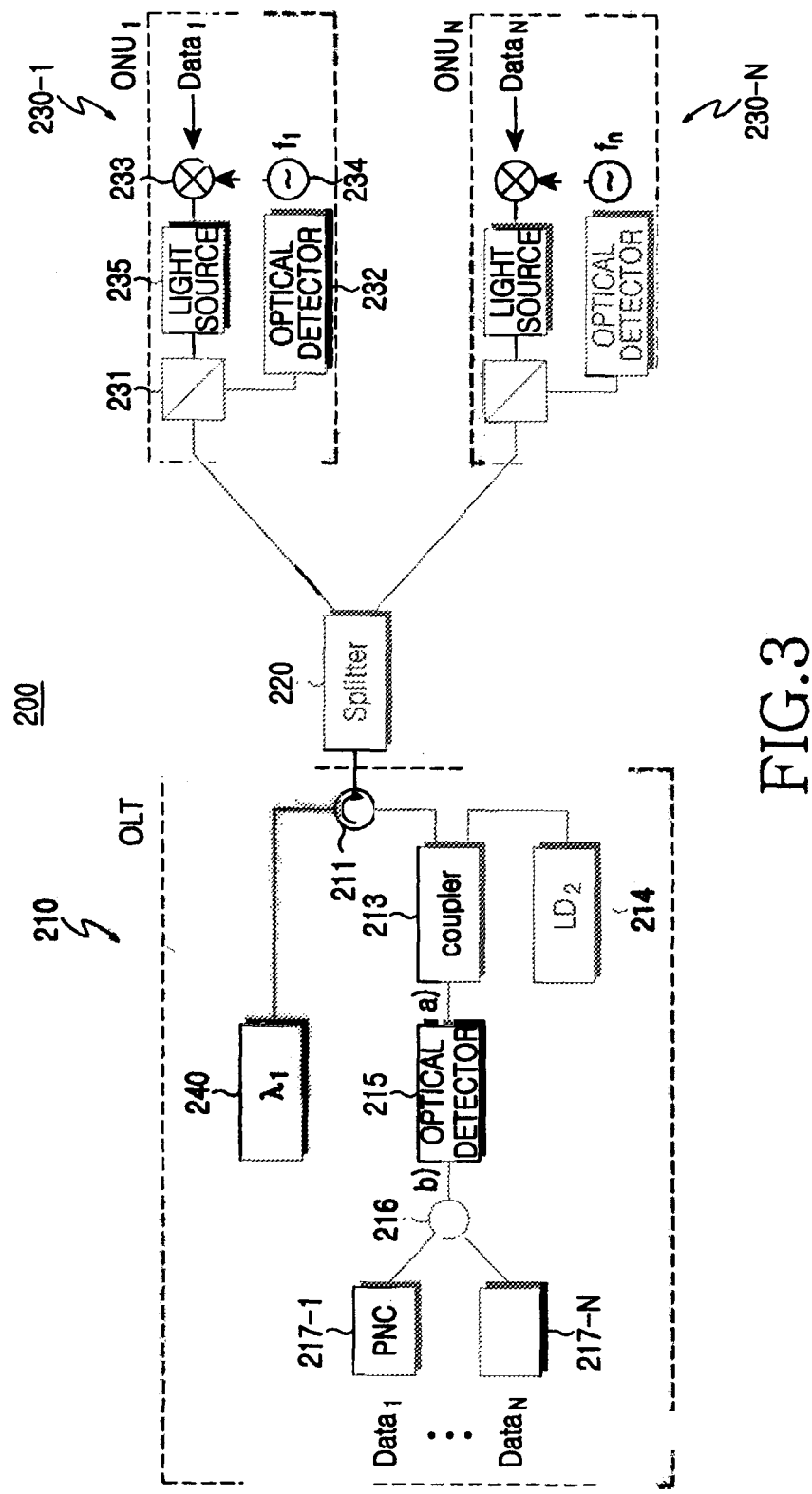
FIG. 3 shows a subcarrier multiplexing type passive optical network according to a first embodiment of the present invention.

FIG. 3 shows a subcarrier multiplexing type passive optical network according to a first embodiment of the present invention. Referring to FIG. 3, the passive optical network 200 includes an optical line terminal 210 for detecting data from a plurality of upstream subcarrier channels and creating a downstream optical signal consisting of downstream subcarrier channels having respective proper frequencies, a plurality of optical network units 230-1 to 230-N for detecting data from the downstream subcarrier channels having respective frequencies allocated thereto and creating upstream subcarrier channels, and a remote node (splitter) 220 positioned between the optical network units 230-1 to 230-N and the optical line terminal 210.

The optical line terminal 210 includes a light creation unit 240 for creating a single wavelength of downstream optical signal loaded with a plurality of downstream subcarrier channels having respective proper frequencies, a light source 214, an optical coupler 213, an optical circulator 211, an optical detector 215, an electric signal splitter or divider 216, and a plurality of demodulators 217-1 to 217-N. The optical circulator 211 is positioned between the light creation unit 240 and the optical coupler 213 while being linked to the remote node 220. The optical coupler 213 outputs the downstream optical signal to the remote node 220 and outputs an upstream optical signal, which has been received from the remote node 220, to the optical coupler 213.

Figure 4:
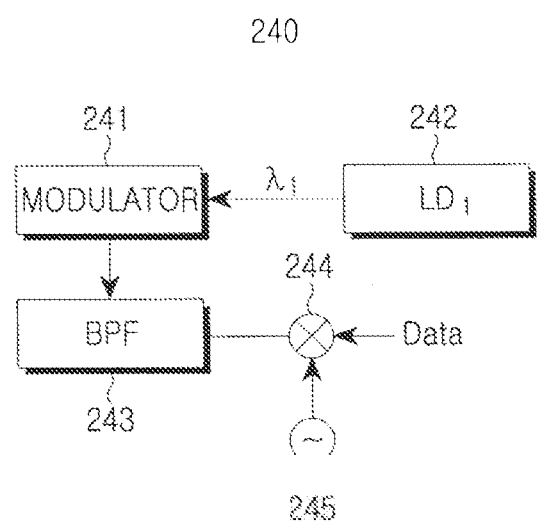
FIG. 4 shows a light creation unit of the network shown in FIG. 3.

FIG. 4 is a block diagram showing the construction of the light creation unit. Referring to FIG. 4, the light creation unit 240 includes a light source 242 for creating downstream light, particularly a single wavelength of downstream optical light consisting of a plurality of downstream subcarrier channels having respective proper frequencies; a frequency creation unit 244 for creating data having a proper frequency, a band pass filter 243 for limiting the frequency band created by the frequency creation unit 244 and a modulator 241 for modulating the data, which is inputted from the band pass filter 243, into downstream subcarrier channels of downstream light.

Referring now to FIG. 3, the light source 214 creates light having a wavelength different from that of the upstream optical signal and outputs the created light to the optical coupler 213, which outputs the upstream optical signal and the light to the optical detector 215. After being subjected to wavelength conversion, the upstream optical signal is converted into an electrical signal by the optical detector 215 and is outputted to the electric signal splitter 216. The optical coupler 213 connects the light source 214 to the optical detector 215 for converting the upstream optical signal, which has been subjected to wavelength conversion by the light, into an electric signal.

The electric signal splitter 216 outputs electrical signals, which have been split, to respective demodulators 217-1 to 217-N, which then selects a subcarrier channel having a frequency allocated thereto through a filtering process so that necessary data is detected.

Figure 5A:
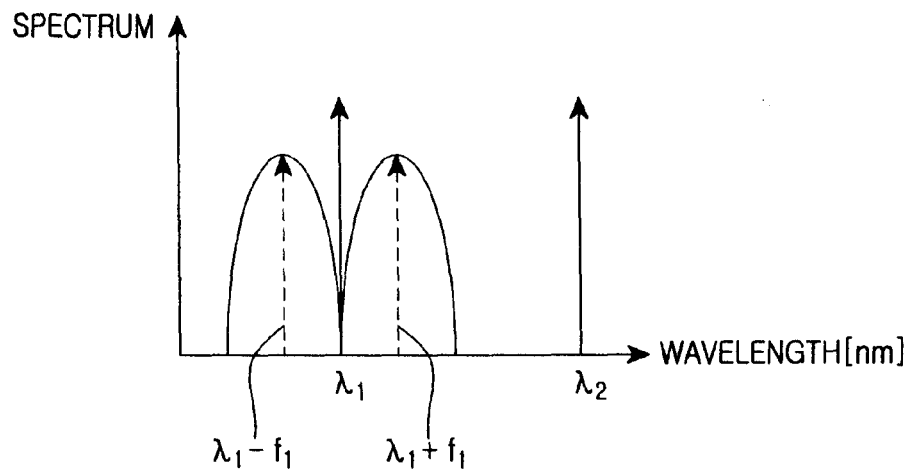
FIGS. 5A and 5B are graphs showing the relationship between wavelength and frequency of subcarrier channels received by an optical line terminal.
Figure 5B:
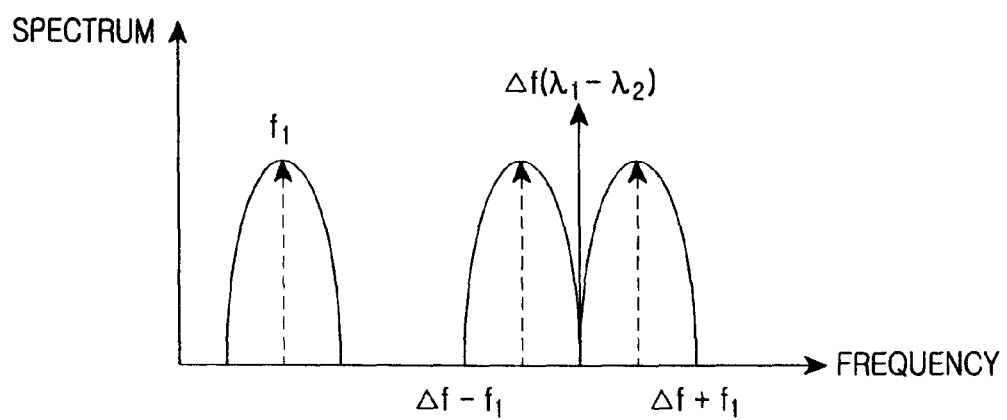

FIGS. 5A and 5B are graphs showing the relationship between wavelength and frequency of subcarrier channels received by the optical line terminal. FIG. 5A shows the wavelength spectrum of light and upstream optical signal, which are inputted from the optical coupler 213 to the optical detector 215. Particularly, FIG. 5A shows subcarrier channels $\lambda_1-f_1$ and $\lambda_2-f_2$ around an upstream optical signal $\lambda_1$, as well as light $\lambda_2$ spaced from the upstream optical signal $\lambda_1$ by a predetermined wavelength interval.

FIG. 5B shows an electric signal, which has been subjected to photoelectric conversion by the optical detector 215. Particularly, the frequency band $\Delta f$ of the electric signal is shifted by as much as the difference $\lambda_1-\lambda_2$ in wavelength between the upstream optical signal and the created light. In addition, subcarrier channels $\Delta f-f_1$ and $\Delta f+f_1$ about the shifted frequency band $\Delta f$ are also shifted from the originally allocated frequency band. After the light source 214 creates light having a frequency band shifted from the upper optical signal, the optical detector 215 subjects the received light to photoelectric conversion together with the upstream optical signal After the photoelectric conversion, the electric signal consists of subcarrier channels, the frequency band of which has been shifted by the light.

Figure 6A:
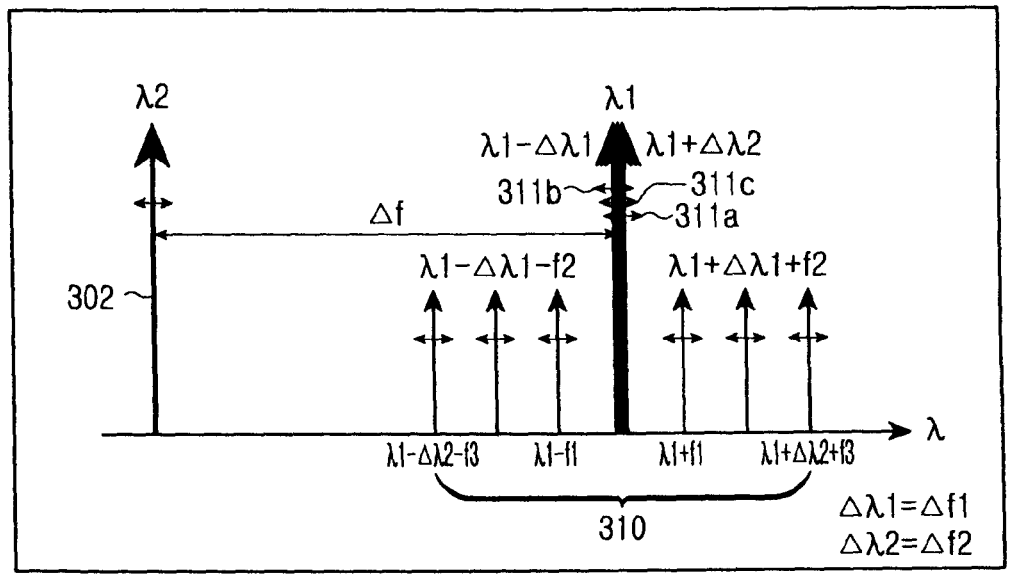
FIGS. 6A and 6B are graphs showing wavelength shift of optical signals consisting of a plurality of subcarrier channels.
Figure 6B:
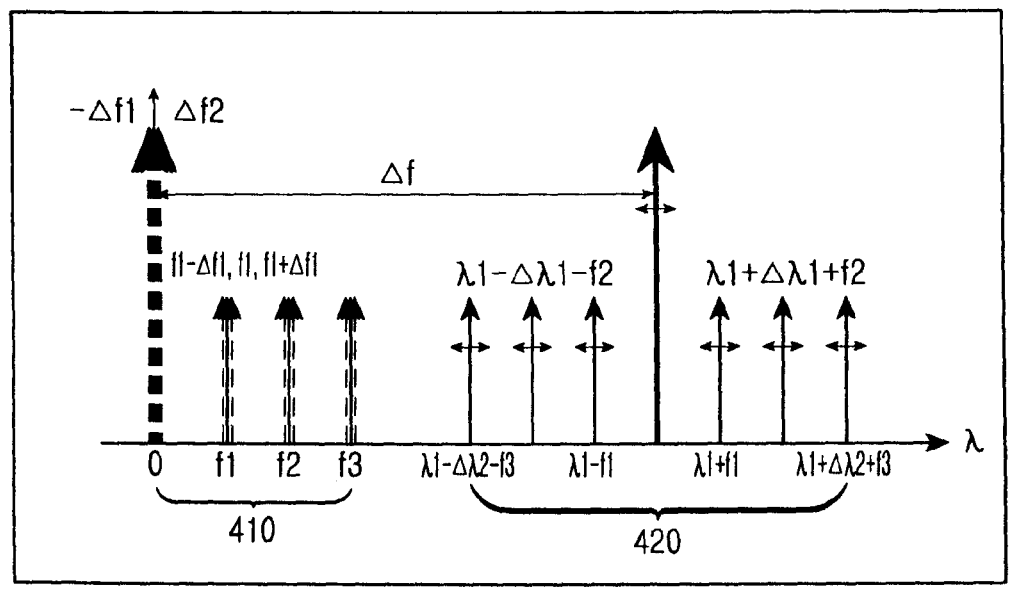

FIGS. 6A and 6B are graphs showing wavelength shift of optical signals consisting of a plurality of subcarrier channels. Referring to FIGS. 6A and 6B, the central wavelength $\lambda_1$ of the upstream optical signal detected by the optical detector 215 is not identical to the wavelengths $\lambda_1-\Delta\lambda_1$ and $\lambda_2+\Delta\lambda_2$ of the subcarrier channels of the optical network units 230-1 to 230N, due to the difference in transmission distance. This results in phase noise. More particularly, after photoelectric conversion, optical beat interference occurs in the reception band of the subcarrier channels, the wavelength of which differs from the central wavelength of the upstream optical signal, as indicated by reference numeral 410 in FIG. 6 B (i.e. undesired frequencies occur about $f_1$, $f_2$, and $f_3$). In contrast, according to the present invention, light is created with a wavelength different from that of the upstream optical signal and is subjected to photoelectric conversion so that a new band is established at a gap between frequencies of the upstream optical signal and the light, as indicated by reference numeral 420 in FIG. 6 B. As a result, the optical beat interference is suppressed.

Respective demodulators 217-1 to 217-N may include a phase noise removal circuit (not shown) and a band pass filter (not shown) so as to detect data from upstream subcarrier channels of a corresponding frequency.

Returning to FIG. 3, optical network units 230-1 to 230-N each include a upstream light source 235 for creating upstream light, an optical detector 232 for detecting data from downstream subcarrier channels of an allocated frequency, a wavelength selection coupler 231 for linking the upstream light source 235 and the optical detector 232 to the remote node 220, an upstream frequency creation unit 234 for creating data having a proper frequency; and an upstream modulator 233 for modulating data created by the upstream frequency creation unit 234 into an upstream subcarrier channel for the upstream light. The modulated subcarrier channel is subjected to optical modulation by the light source 235 and is outputted to the optical light terminal 210 via the wavelength selection coupler 231.

Figure 7:
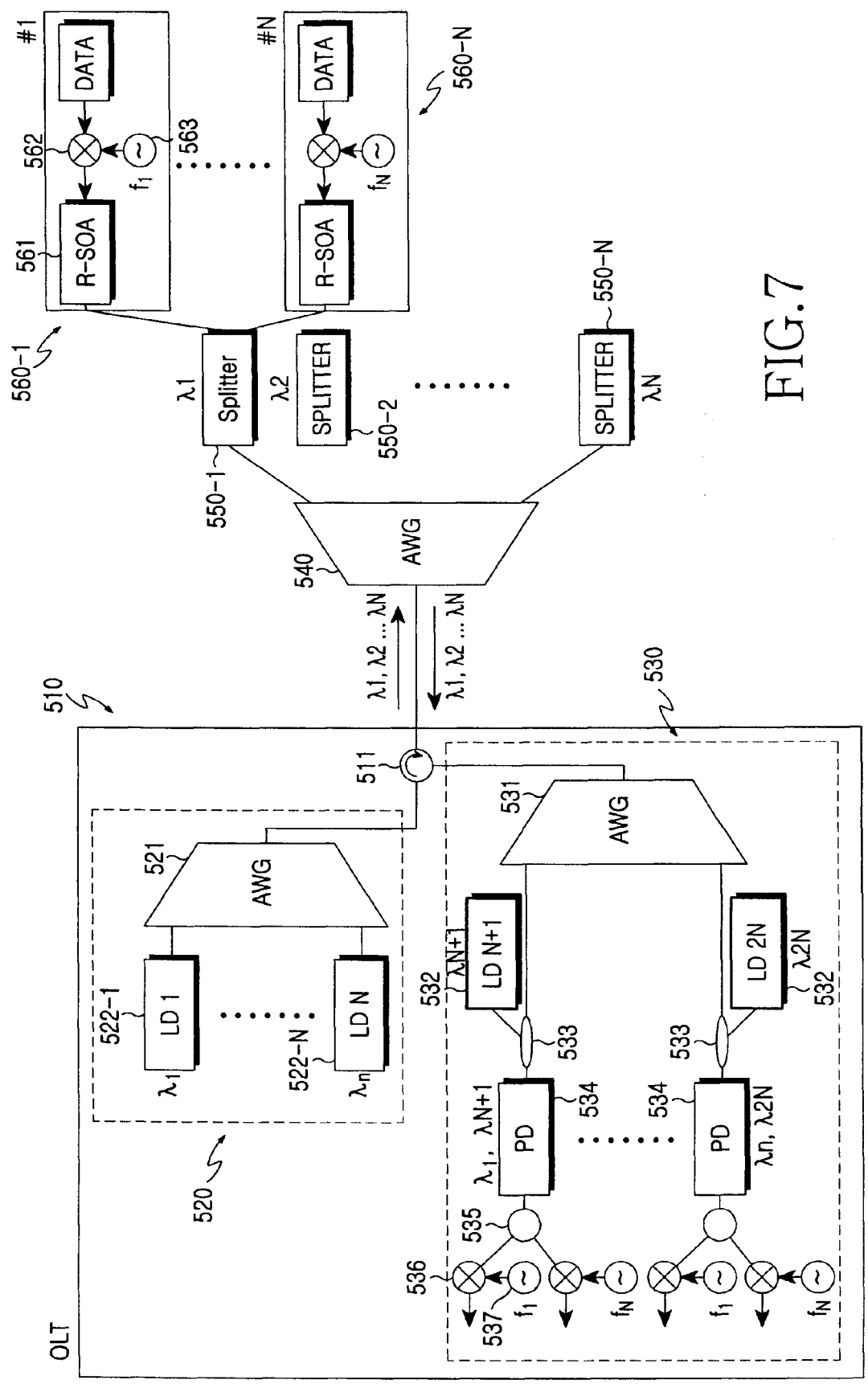
FIG. 7 shows the construction of a passive optical network according to a second embodiment of the present invention.

FIG. 7 shows the construction of a passive optical network according to a second embodiment of the present invention. The passive optical network 500 according to the present embodiment includes an optical line terminal 510 for creating multiplexed downstream optical signals having different wavelengths and detecting data from multiplexed upstream optical signals, a plurality of optical network units 560-1 to 560-N for detecting data from a downstream subcarrier channel having a corresponding frequency and creating an upstream subcarrier channel having a corresponding frequency, and remote nodes 540, 550-1 to 550-N positioned between the optical network units 560-1 to 560-N and the optical line network 510.

The optical line terminal 510 includes a plurality of light sources 522- to 522-N for creating downstream optical signals having different wavelengths, which consist of a plurality of downstream subcarrier channels having different frequencies, a multiplexer 521 for multiplexing the downstream optical signals, and a detector 530 for detecting data from upstream subcarrier channels.

The detector 530 includes a demultiplexer 31 for demultiplexing multiplexed upstream optical signals; a plurality of light sources 532 for creating light having a wavelength different from that of the demultiplexed upstream optical signals; a plurality of optical detectors 534 for photoelectrically converting a corresponding wavelength of light and the upstream optical signals into electric signals; a plurality of intensity dividers 535 for dividing the intensity of respective electric signals, and a plurality of demodulators 537 connected to respective intensity dividers 535 so as to detect data from an upstream subcarrier channel having a frequency allocated thereto. The light sources 532 are connected to corresponding optical detectors 534 via optical couplers 533, respectively.

The remote nodes 540, 550- to 550-N include a multiplexer/demultiplexer 540 for demultiplexing multiplexed downstream optical signals and multiplexing the upstream optical signals and a plurality of optical intensity dividers 550-1 to 550-N for dividing the intensity of demultiplexed downstream optical signals of corresponding wavelengths and coupling respective upstream subcarrier channels to upstream optical signals of corresponding wavelengths. The optical intensity dividers 550-1 to 550-N are linked to a plurality of optical network units 560-1 to 560-$n$, which are provided with downstream optical signals of corresponding wavelengths.

Particularly, the remote nodes 540, 550-1 to 550-N perform wavelength division multiplexing and demultiplexing by demultiplexing the downstream optical signals based on respective wavelengths and multiplexing upstream optical signals having different wavelengths.

Respective optical network units 560-1 to 560-N are linked to corresponding optical intensity dividers 550- to 550-N so as to filter downstream optical signals of corresponding wavelengths, which have been subjected to intensity division, and obtain downstream subcarrier channels having frequencies allocated thereto. Data is detected on the downstream subcarrier channels. The optical network units 560-1 to 560-$n$ may create upstream subcarrier channels having frequencies allocated thereto. Respective optical network units 560- to 560-$n$ may include a semiconductor optical amplifier 561 for creating upstream light, a semiconductor optical modulator 562 for creating an upstream subcarrier channel by modulating the proper frequency of the upstream light, and a frequency creation unit 563. Although, the linkage between the optical intensity divider 550-1 and the optical network units 560-1 to 560-N is solely shown in FIG. 7 for clarity, a linkage of the same structure applies to that between remaining optical intensity dividers 550-2 to 550-N and the optical network units 560-1 to 560-N.

As mentioned above, the subcarrier-type passive optical network according to the present invention is advantageous in that, since the optical beat interference is suppressed, the number of optical line terminals of the network increases. In addition, erroneous operation resulting from system degradation is minimized.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A subcarrier multiplexing type optical communication method for reducing optical beat interference, comprising the steps of:

receiving by an optical line terminal (OLT) an upstream optical signal comprising a plurality of upstream subcarrier channels having different frequencies respectively output from a plurality of optical network units (ONUs);

creating by a first light source of the OLT a downstream optical signal having a different wavelength than the upstream optical signal, and transmitting the downstream optical signal to the plurality of ONUs;

shifting by the OLT a wavelength of the upstream optical signal wherein the shifting of the wavelength of the upstream optical signal by the OLT is performed by coupling the upstream optical signal with a second light source;

converting the shifted upstream optical signal into an electrical signal; and detecting data from the electrical signal.

2. A subcarrier multiplexing type optical line terminal (OLT) for detecting data from a plurality of upstream subcarrier channels, the terminal comprising:

a light creation unit having a first light source for creating a downstream optical signal;

a second light source arranged in the OLT having a wavelength different from a wavelength of an upstream optical signal composed of the upstream subcarrier channels from respective ONUs;

an optical coupler that couples an output of the second light source with the upstream optical signal to shift wavelength of the upstream optical signal;

an optical detector for converting the wavelength shifted optical signal into an electrical signal; and a plurality of demodulators for detecting data from the electrical signal.

3. The terminal as claimed in claim 2, further comprising:

an optical coupler for coupling the upstream optical signal and the output of the second light source, and outputs the wavelength shifted upstream optical signal to the optical detector, and an electric signal splitter positioned between the plurality of demodulators and the optical detector, the electric signal splitter splitting the electrical signal, and outputting the electric signal to the demodulators.

4. A passive optical network comprising:

an optical line terminal for creating a downstream optical signal including a plurality of downstream subcarrier channels and detecting data from an upstream optical signal including a plurality of upstream subcarrier channels;

a plurality of optical network units for detecting data from an allocated downstream subcarrier channel of the plurality of downstream subcarrier channels and creating the plurality of upstream subcarrier channels in which each optical network unit of the plurality of optical network units having an allocated upstream subcarrier channel; and a remote node positioned between the optical line terminal and the plurality of optical network units for multiplexing the plurality of upstream subcarrier channels into an upstream optical signal and outputting the upstream optical signal to the optical line terminal, the remote node subjecting the downstream optical signal to intensity division and outputting the downstream optical signal to the plurality of optical network units, wherein the optical line terminal includes a first light source comprising a downstream light source used by the optical line terminal for creating the downstream optical signal, and a second light source having a frequency shifted from the upstream optical signal, wherein each of the plurality of optical network units includes an upstream light source for creating a respective upstream subcarrier channel of the plurality of subcarrier channels of the upstream optical signal, and wherein the upstream optical signal is subjected to a wavelength shift at the optical line terminal by coupling the upstream optical signal with the second light source to create a wavelength shifted upstream optical signal.

5. The passive optical network as claimed in claim 4, wherein the optical line terminal comprises:
   an optical detector for converting the upstream optical signal into an electrical signal, the upstream optical signal having been subjected to wavelength conversion by the second light source of the optical line terminal;
   a plurality of demodulators for detecting data corresponding to the upstream optical signal including the plurality of subcarrier channels from the electric signal;
   an optical coupler for coupling the upstream optical signal and the second light source to subject the upstream optical signal to wavelength shift, the optical coupler outputting the wavelength shifted upstream optical signal to the optical detector; and
   an electric signal splitter positioned between the demodulators and the optical detector, the electric signal splitter splitting an electric signal, the electric signal having been subjected to photoelectric conversion by the optical detector, and outputting the electric signal to the demodulators.

6. The passive optical network as claimed in claim 5, wherein the optical line terminal further comprises:
   a light creation unit including the first light source for creating the downstream optical signal including a plurality of downstream subcarrier channels, frequencies having been allocated to the downstream subcarrier channels, respectively; and
   a circulator positioned between the light creation unit and the optical coupler so as to output the upstream optical signal to the optical coupler, the circulator receiving the downstream optical signal from the light creation unit and outputting the downstream optical signal to an outside of the optical line terminal.

7. The passive optical network as claimed in claim 6, wherein the light creation unit further includes:
   a frequency creation unit for creating data having a frequency;
   a band pass filter for limiting a frequency band of data created by the frequency creation unit; and
   a modulator for modulating data, the data being inputted from the band pass filter, into a downstream subcarrier channel of the downstream light.

8. The passive optical network as claimed in claim 4, wherein each optical network unit comprises:
   an optical detector for detecting data from a downstream subcarrier channel of an allocated frequency;
   a wavelength selection coupler for linking the upstream light source and the optical detector to the remote node; and
   an upstream frequency creation unit for creating data having a frequency; and
   an upstream modulator for modulating data, the data having been created by the upstream frequency creation unit, into an upstream subcarrier channel of the upstream light.

9. The passive optical network as claimed in claim 4, wherein the remote node comprises an optical intensity divider.

10. A passive optical network (PON) comprising:
    an optical line terminal (OLT) having a first light source for creating downstream optical signals composed of downstream subcarrier channels having respective frequencies, the optical line terminal subjecting an upstream optical signal of a corresponding wavelength to wavelength shift by a second light source at the OLT so that data is detected from an upstream subcarrier channel;
    a plurality of optical network units for detecting data from respective downstream subcarrier channels having a corresponding wavelength and creating respective upstream subcarrier channels having a corresponding wavelength; and
    a remote node for subjecting the downstream optical signals to intensity division and outputting the downstream optical signals to optical network units, respectively, the remote node multiplexing respective upstream subcarrier channels into upstream optical signals having respective wavelengths and outputting the upstream optical signals to the optical line terminal;
    wherein the OLT couples the upstream optical signals with the second light sources to shift the wavelengths of the upstream optical signals, and converts the shifted upstream optical signals into electrical signals.

11. The passive optical network as claimed in claim 10, wherein the optical line terminal comprises:
    a plurality of first light sources for creating downstream optical signals having different wavelengths, the downstream optical signals being composed of a plurality of downstream subcarrier channels having different frequencies;
    a multiplexer for multiplexing the downstream optical signals; and
    a detection unit for detecting data from upstream subcarrier channels.

12. The passive optical network as claimed in claim 11, wherein the detection unit comprises:
    a demultiplexer for demultiplexing multiplexed upstream optical signals;
    the plurality of second light sources for creating second lights having wavelengths different from wavelengths of demultiplexed upstream optical signals;
    a plurality of optical detectors for photoelectrically converting the shifted wavelength upstream optical signals into electric signals;
    a plurality of intensity dividers for subjecting the electric signals to intensity division;
    a plurality of demodulators connected to the intensity dividers, respectively, so as to detect data from an upstream subcarrier channel of an allocated frequency; and
    a plurality of optical couplers for connecting the second light sources to corresponding optical detectors, respectively.

13. The passive optical network as claimed in claim 10, wherein the remote node comprises:
    a multiplexer/demultiplexer for demultiplexing multiplexed downstream optical signals and multiplexing the upstream optical signals; and
    a plurality of optical intensity dividers for subjecting a demultiplexed downstream optical signal of a corresponding wavelength to intensity division and coupling respective upstream subcarrier channels to upstream optical signals of corresponding wavelengths.

* * * * *